United States Patent
Bendickson et al.

(10) Patent No.: US 10,986,076 B1
(45) Date of Patent: Apr. 20, 2021

(54) INFORMATION FLOW ENFORCEMENT FOR IP DOMAIN IN MULTILEVEL SECURE SYSTEMS

(71) Applicant: Rockwell Collins, Inc., Cedar Rapids, IA (US)

(72) Inventors: John G. Bendickson, Vinton, IA (US); James A. Marek, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 115 days.

(21) Appl. No.: 16/456,273

(22) Filed: Jun. 28, 2019

Related U.S. Application Data

(63) Continuation-in-part of application No. 15/648,323, filed on Jul. 12, 2017, now Pat. No. 10,757,111.

(60) Provisional application No. 62/385,070, filed on Sep. 8, 2016.

(51) Int. Cl.
*H04L 29/06* (2006.01)

(52) U.S. Cl.
CPC ........ *H04L 63/0485* (2013.01); *H04L 63/126* (2013.01)

(58) Field of Classification Search
CPC ............. H04L 63/0209; H04L 63/0218; H04L 63/0236; H04L 63/0245; H04L 63/0281; H04L 63/0471; H04L 63/0485; H04L 63/10; H04L 63/105; H04L 63/126; H04L 63/1416
See application file for complete search history.

(56) References Cited

U.S. PATENT DOCUMENTS

| | | | |
|---|---|---|---|
| 5,640,456 A | 6/1997 | Adams, Jr. et al. | |
| 7,215,667 B1 * | 5/2007 | Davis | H04L 12/4633 370/389 |
| 7,606,254 B1 | 10/2009 | Hardin et al. | |
| 7,643,495 B2 | 1/2010 | Metsker | |
| 8,161,529 B1 | 4/2012 | Bortz et al. | |
| 8,346,949 B2 * | 1/2013 | Vaarala | H04L 61/256 709/229 |
| 8,843,997 B1 * | 9/2014 | Hare | H04L 63/0815 726/3 |
| 9,660,966 B1 | 5/2017 | Marek et al. | |
| 2002/0159389 A1 | 10/2002 | Foster et al. | |
| 2002/0188839 A1 * | 12/2002 | Noehring | H04L 69/04 713/153 |

(Continued)

*Primary Examiner* — Eric W Shepperd
(74) *Attorney, Agent, or Firm* — Suiter Swantz pc llo

(57) ABSTRACT

A multilevel security (MLS) network is disclosed. The MLS network includes untrusted nodes (UTN) capable of receiving messages en route from a source node to a destination node, each message having an unencrypted outer header, an encrypted inner header, and a data payload. UTNs route messages toward their destination as directed by the outer header. Global trusted nodes (GTN) decrypt a portion of the inner header to validate source and destination information before routing the message forward. GTNs further modify the outer header to obfuscate source and destination information from the UTNs. Local trusted nodes (LTN) serve as gateway nodes into a local network. LTNs also validate source and destination information to regulate admission to the local network. LTNs include an address manager which decrypts an additional portion of the inner header to read local address data and generates local messages for routing through the local network.

15 Claims, 3 Drawing Sheets

(56) References Cited

U.S. PATENT DOCUMENTS

| | | | |
|---|---|---|---|
| 2003/0105881 A1 | 6/2003 | Symons et al. | |
| 2003/0131228 A1* | 7/2003 | Twomey | H04L 29/06 |
| | | | 713/153 |
| 2004/0098485 A1* | 5/2004 | Larson | H04L 63/1458 |
| | | | 709/227 |
| 2004/0103277 A1* | 5/2004 | Seada | H04L 63/08 |
| | | | 713/160 |
| 2004/0139313 A1* | 7/2004 | Buer | H04L 69/22 |
| | | | 713/150 |
| 2004/0143734 A1* | 7/2004 | Buer | H04L 63/0485 |
| | | | 713/153 |
| 2005/0060407 A1* | 3/2005 | Nagai | H04L 63/0236 |
| | | | 709/225 |
| 2007/0177550 A1* | 8/2007 | Kwon | H04W 12/001 |
| | | | 370/331 |
| 2008/0072312 A1* | 3/2008 | Takeyoshi | H04L 63/061 |
| | | | 726/15 |
| 2010/0135287 A1* | 6/2010 | Hosain | H04L 47/10 |
| | | | 370/389 |
| 2011/0277014 A1* | 11/2011 | Tan | H04L 63/08 |
| | | | 726/3 |
| 2013/0219495 A1 | 8/2013 | Kulaga et al. | |
| 2013/0227284 A1 | 8/2013 | Pfeffer et al. | |
| 2014/0153435 A1 | 6/2014 | Rolette et al. | |
| 2015/0372854 A1 | 12/2015 | Furukawa | |
| 2016/0205071 A1 | 7/2016 | Cooper et al. | |
| 2020/0304477 A1* | 9/2020 | Venkataraman | H04L 63/0272 |

* cited by examiner

INFORMATION FLOW ENFORCEMENT FOR IP DOMAIN IN MULTILEVEL SECURE SYSTEMS

CROSS-REFERENCE TO RELATED APPLICATIONS

The instant application claims the benefit under 35 USC §§ 119(e) and 120 to the following United States Patent Applications:

Pending U.S. patent application Ser. No. 15/648,323 filed Jul. 12, 2017 and entitled INFORMATION FLOW ENFORCEMENT FOR MULTILEVEL SECURE SYSTEMS, naming James A. Marek, Jonathon C. Skarphol, Adam W. Pfab, Edward C. Tubbs, and John G. Bendickson as inventors, which application in turn claims priority to:

U.S. Provisional Patent Application Ser. No. 62/385,070 filed Sep. 8, 2016 and entitled INFORMATION FLOW ENFORCEMENT FOR MULTILEVEL SECURE SYSTEMS, naming James A. Marek, Jonathon C. Skarphol, Adam W. Pfab, Edward C. Tubbs, and John G. Bendickson as inventors.

Said U.S. patent application Ser. No. 15/648,323 and 62/385,070 are herein incorporated by reference in their entirety.

BACKGROUND

Multilevel security (MLS) refers to the ability of a communication system to handle information with different classifications (e.g., different security levels), permit access by users/applications with different security clearances, and prevent users/applications from obtaining access to information for which they lack authorization. Management of information flow for MLS systems is critical. Conventional information flow management and mediation techniques for MLS systems generally rely on high assurance custom infrastructures or trusted computing elements (e.g., high assurance separation kernels hosted on evaluated processors) to facilitate all transactions of MLS traffic flows. Trusted computing elements tend to be either low performance or high power, very complex, and high cost, which are especially true when high assurance support is required.

When operating global training or simulation systems (e.g., live, virtual, and constructive (LVC) training systems), an MLS environment is required to accommodate the various participants (which, for example, may include both U.S.-based and NATO-based players) while preserving data traffic at a sufficient speed to maintain the realism of the event. Such high-speed high-bandwidth data traffic requires open networks to operate efficiently, which in turn requires secure MLS gateways.

SUMMARY

A multilevel security (MLS) network of interconnected nodes is disclosed. In embodiments, the MLS network includes untrusted nodes (UTN) capable of receiving messages en route from a source node to a destination node, each message having an unencrypted outer header, an encrypted inner header, and a data payload. The untrusted nodes route messages toward their destination nodes as directed by the outer header. The MLS network includes global trusted nodes (GTN) capable of decrypting a portion of the inner header and thereby validating the message source and destination before routing the message forward. Global trusted nodes further modify the outer header to obfuscate source and destination information from the untrusted nodes. The MLS network further includes local trusted nodes (LTN) capable of serving as gateway nodes into a local network. Local trusted nodes include the validator portion also found in global trusted nodes, whereby a portion of the inner header is decrypted to validate the source and destination information (and thereby determine whether to admit the message to the local network). Messages passed by the validator are routed to an address manager of the LTN, which decrypts an additional portion of the inner header to read local address data and generates, based on the received message, a local message for routing through the local network.

A multilevel security (MLS) network is also disclosed. In embodiments, the network includes a group of local nodes interconnected by a communication fabric, the fabric including communication ports facilitating communications and transmissions between the local nodes. The network includes a root of trust capable of defining allowable memory address ranges for each local node within the network. Trusted address management units (AMU) connect each node to its respective communication port and extract local address maps from received local messages. The trusted AMUs regulate communication with their associated nodes based on whether the extracted address maps match allowable address ranges determined by the root of trust. The MLS network includes at least one local trusted node (LTN) connecting the communication fabric to devices, networks, or other nodes external to the MLS network. Local trusted nodes receive inbound messages from the external nodes (the messages including an unencrypted outer header, an encrypted inner header, and a data payload) and validate the source and destination information of inbound messages by decrypting a portion of the inner header (thereby determine whether to admit the message to the local network). Validated inbound messages are routed to an address manager of the LTN, which decrypts an additional portion of the inner header to read local address data (e.g., local address maps) and generates, based on the received message, local messages for routing through the MLS network.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
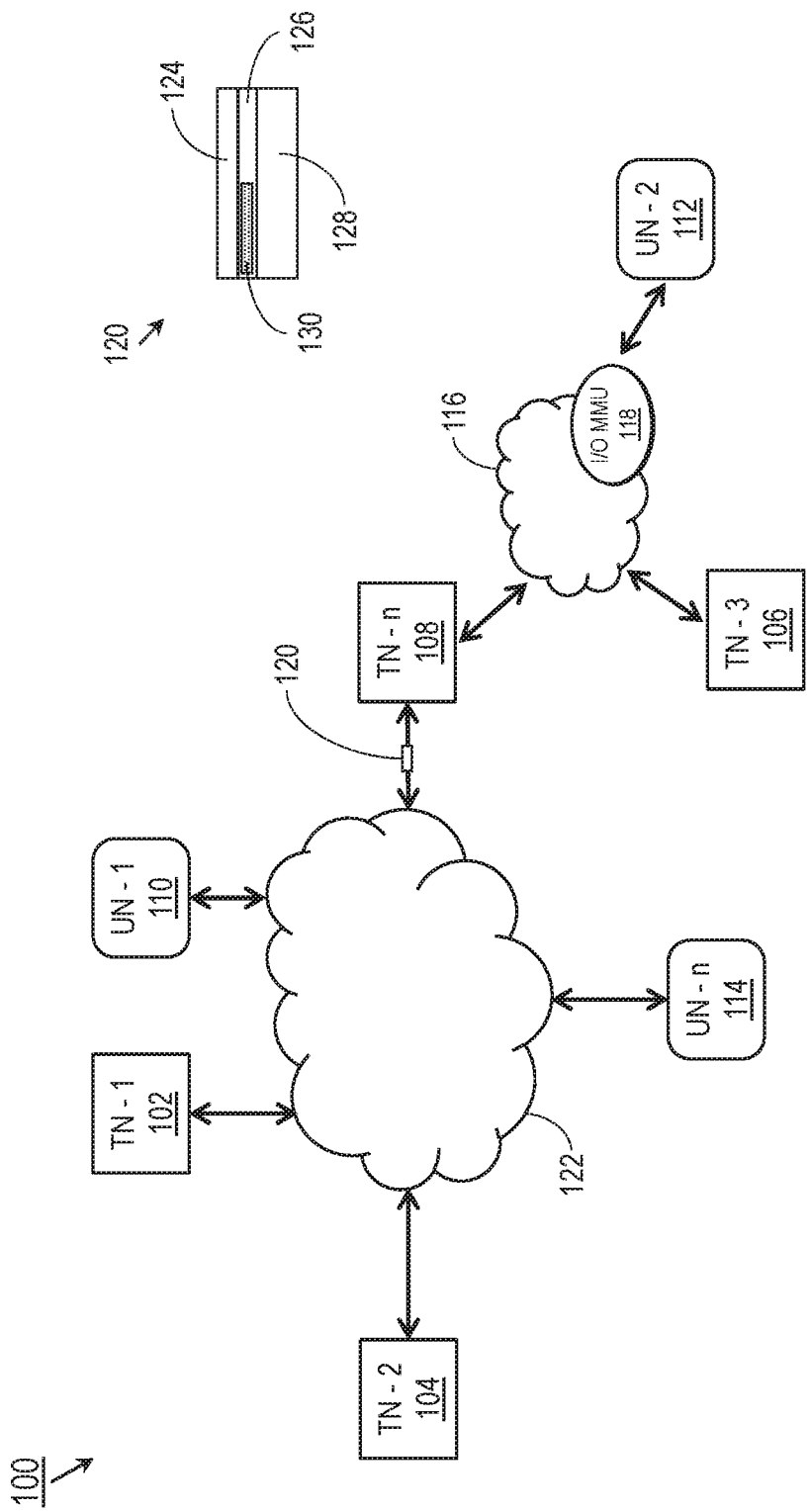
FIG. 1 is a block diagram illustrating a multilevel security (MLS) environment in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a multilevel security (MLS) environment 100 (e.g., MLS network) is disclosed. In embodiments, the MLS environment 100 may include trusted nodes 102, 104, 106, 108; untrusted nodes 110, 112, 114 (UTN); and local networks 116 incorporating input/output memory management units 118 (I/O MMU or trusted address management units (AMU), e.g., as disclosed in detail by the above-referenced U.S. patent application Ser. No. 15/648, 323).

For example, the trusted nodes 102-108 and untrusted nodes 110-114 may both regulate the transmission of messages 120 through the Internet (122) and to, from, and within local networks 116. Each message 120 may include an unencrypted outer header 124, an encrypted inner header 126 (e.g., system-level header (SLH)), and a data payload 128 (e.g., data packet/target address). For example, the inner header 126 and data payload 128 may reside inside standard TCP/IP and may be separately encrypted according to separate standards or cryptographic protocols. The data payload 128 may be separately encrypted and only decryptable by a trusted recipient, e.g., to protect the data payload from header evaluation machinery. In some embodiments, portions of the data payload 128 (e.g., apart from the target source and destination addresses) may be further encrypted for security reasons.

In embodiments, each message 120 within the MLS environment 100 may include an encrypted identifier 130 appended to the inner header 126 for use by trusted nodes 102-108. The messages 120 may otherwise be fully formed for transit via the world wide web (WWW) or via commercial off-the-shelf (COTS) Ethernet switches and router chips, such that the MLS environment 100 may incorporate such COTS devices as well as the WWW.

Figure 2A:
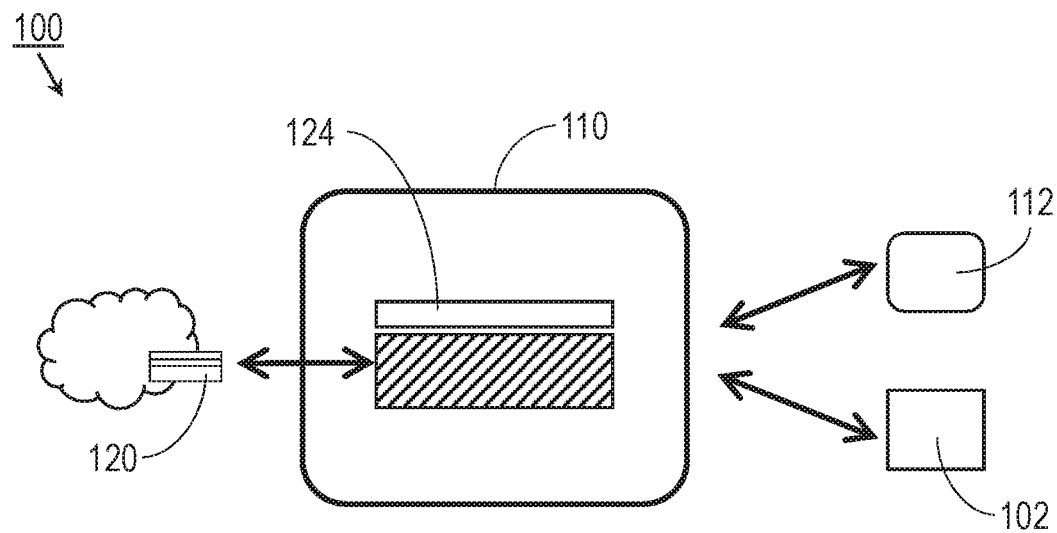
FIGS. 2A and 2B are diagrammatic illustrations of operations of the MLS environment of FIG. 1.
Figure 2B:
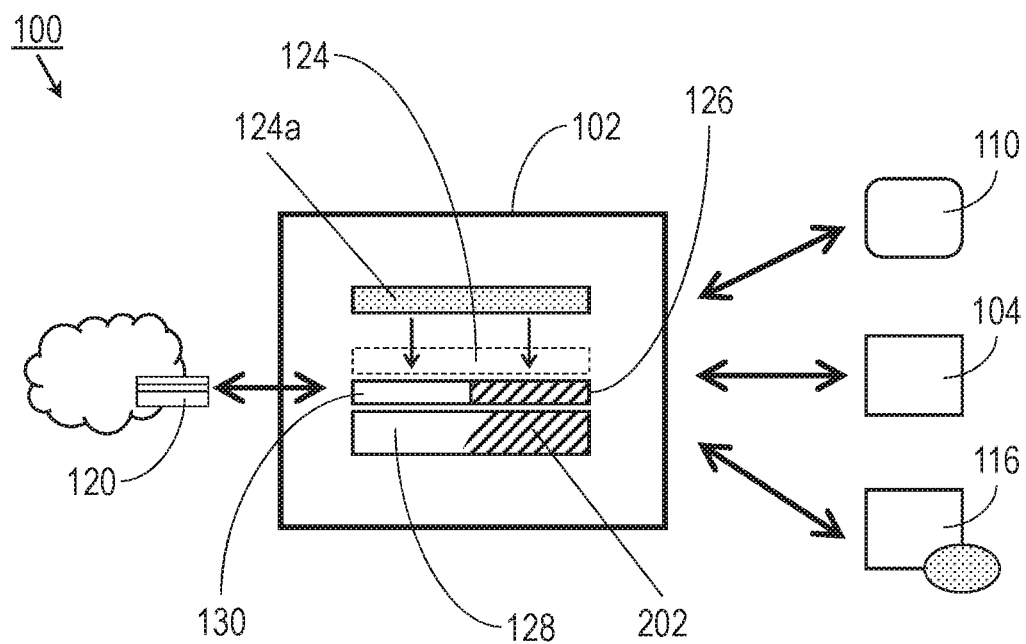

Referring to FIGS. 2A and 2B, the MLS environment 100 is disclosed. In embodiments, referring in particular to FIG. 2A, an untrusted node 110 may route messages 120 throughout the MLS environment 100 based on their unencrypted outer headers 124. For example, the untrusted node 110 may read the unencrypted outer header 124 and follow any routing instructions therein, e.g., forwarding the message 120 to another untrusted node 112 or to a trusted node 102. The remainder of the message 120 may remain encrypted or otherwise protected from the untrusted node 110, e.g., protecting an untrusted COTS device from any malware, external or internal, capable of affecting its device settings.

In embodiments, referring in particular to FIG. 2B, a trusted node 102 may be either global or local in nature. For example, global trusted nodes (GTN) may similarly route messages 120 through the MLS environment 100 while local trusted nodes (LTN) may be in communication with a local network 116 and regulation of inbound and outbound messages to, from, and between nodes of the local network. However, the trusted node 102 may first decrypt a portion of the inner header 126 to verify or validate the true source and destination nodes of the message 120. For example, the trusted node 102 may decrypt only the encrypted identifier portion (130) of the inner header 126 and, e.g., compare this decrypted information to the unencrypted outer header 124. On validating the destination node of the message 120 the trusted node 102 may (e.g., if the trusted node is a global trusted node) generate a routing path via which the message may reach its destination node, forwarding the message to the next point in the routing path (which may be another trusted node 104 or an untrusted node 110). Before forwarding the message 120, the trusted node 102 may modify the outer header (124a) such that the generated routing path is followed, stripping off the original outer header 124 to partially or fully obfuscate the true source and destination nodes from untrusted nodes 110. For example, the trusted node 102 may generate a routing path providing that the message 120 reach its destination only after relaying through a given number of subsequent untrusted nodes 110 and trusted nodes 104. The encrypted identifier 130 may include a Minimum Route Number (MRN) equivalent to the minimum number of subsequent trusted nodes 104 through which the message 120 must be routed before reaching its ultimate destination node. When formulating a path for the message 120 to its ultimate destination node, the trusted node 102 may decrement the MRN; the next trusted node (104) in the path may thus regenerate a path for the message reflecting the decremented MRN. The trusted node 102 may employ any appropriate algorithm or combination of algorithms in order to obscure the source, destination, or routing path of the message 120 from untrusted nodes 110.

In embodiments, the trusted node 102 may be a local trusted node (LTN) associated with a local network 116 incorporating the ultimate destination node of the message 120. Accordingly, once the trusted node 102 validates the source and destination addresses of the message 120, the trusted node 102 may regulate the routing of the message through the local network 116 to its destination node. In some embodiments, when the trusted node 102 is a local trusted node, a portion (202) of the data payload 128 may be visible to the trusted node in order to generate a local message or data packet for transmission through the local network 116, as described in greater detail below.

Figure 3:
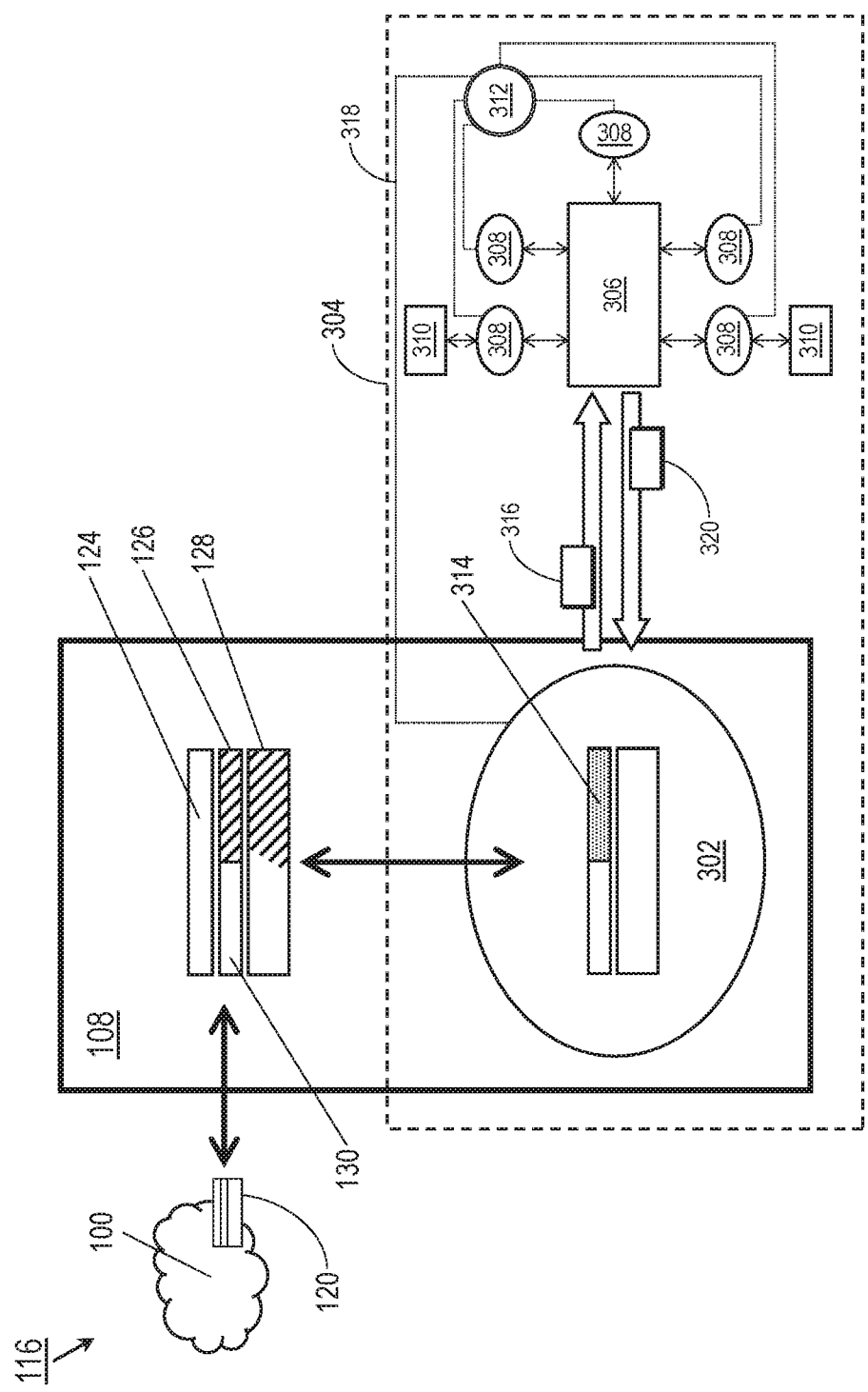
FIG. 3 is a block diagram illustrating a local network incorporating an MLS gateway in accordance with example embodiments of this disclosure.

Referring to FIG. 3, the MLS local network 116 is disclosed. In embodiments, the local network 116 may include a local trusted node 108 (LTN), an address manager 302 (e.g., I/O MMU) within the LTN, a trusted MLS fabric 304 which may incorporate an underlying communication fabric 306, trusted address management units 308 (AMU), local nodes 310, and a root of trust 312.

In embodiments, the trusted MLS fabric 304 and communication fabric 306 may facilitate communication and transmission between the local nodes 310 of the local network 116, with the trusted AMUs 308 regulating communication between the nodes 310 at various levels as substantially disclosed by the above-referenced U.S. patent application Ser. No. 15/648,323.

In embodiments, the local trusted node 108 may regulate the communication of inbound and outbound messages 120 between the local network 116 and the MLS environment 100. The local trusted node 108 may incorporate a first, or validator, stage for validating the source and destination addresses of an inbound message 120 as described above with respect to FIG. 2B. For example, the local trusted node 108 may decrypt the encrypted identifier portion (130) of the inner header 126 to validate the source and destination addresses and confirm that the destination node (or the recipient of the message) is within the local network 116, e.g., by comparing the decrypted portion of the inner header to the unencrypted outer header 128. If for some reason the source or destination address is invalid, the trusted node 108 may prevent the message 120 from accessing the local network 116.

In embodiments, once the source and destination addresses are validated, the validator stage may strip off the outer header 124 and forward the message 120 to the address manager 302, the second stage of the local trusted node 108. The address manager 302 may decrypt a further portion 314 of the inner header 126, using the information incorporated therein to generate a local message 316 (e.g., final data packet) for routing through the trusted MLS fabric 304, the communication fabric 306, and the AMUs 308 of the local network 116. For example, the address manager 302 may replace the TCP/IP header structure of the system-level inner header 126 with local memory address-based routing information derived from the decrypted further portion 314 and a routing path providing for relay through a given number of trusted AMUs 308 before arrival at its intended destination node. Each trusted AMU 308 may regulate the transmission of the local message 316 through the trusted MLS fabric 304 (or the communications fabric 306) based on policies determined by the root of trust 312 connected by trusted communications paths 318 to each trusted AMU.

In embodiments, the address manager 302 may access local memory address maps corresponding to a local destination node 310 of the local message 316 by decrypting the further portion 314 of the inner header 126 and/or a portion of the data payload 128, regulating the routing of the local message 316 across the trusted MLS fabric 304 or communication fabric 306 based on whether the decrypted local address maps are within an allowable memory address range corresponding to the local destination node 310 of the local message.

In embodiments, the local trusted node 108 may similarly receive, and regulate the routing of, outbound local messages 320 whose source node is a local node 310 of the local network 116 and whose destination node is a node, network, or device within the MLS environment 100 but external to the local network. For example, the address manager 302 may encrypt the outbound local message 320 with predetermined keys decryptable by the destination node (e.g., based on addressing schemes determined by the root of trust 312) and then generating an appropriate TCP/IP header or system-level header (e.g., corresponding to the encrypted further portion 314 of the inner header) for routing the outbound local message 320 through the MLS environment 100 to its ultimate destination. Similarly, the validator stage may append an encrypted portion (e.g., corresponding to the encrypted identifier 130) to the system-level header (e.g., the inner header 126) of the outbound local message 320 and generate an appropriate outer header 124 to obfuscate the source and destination of the outbound local message from untrusted nodes (110-114, FIG. 1) throughout the MLS environment 100.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A multilevel security network of interconnected nodes, comprising:
   a plurality of untrusted nodes (UTN), each UTN configured to:
   receive a message in transit between a source node and a destination node, the message comprising one or more of an unencrypted outer header, an encrypted inner header, and a data payload;
   read the outer header;
   and
   route the message toward the destination node based on the outer header;

a plurality of global trusted nodes (GTN), each GTN configured to, on receiving the message:
  decrypt a first portion of the inner header;
  validate at least one of a source address and a destination address of the message based on the decrypted first portion;
  modify the outer header to obfuscate at least one of the source address and the destination address; and
  route the message toward the destination node based on the validation; and
a plurality of local trusted nodes (LTN), each LTN associated with a local network and comprising:
  a) at least one validator configured to, on receiving the message:
    decrypt the first portion;
    validate at least one of the source address and the destination address based on the decrypted first portion; and
    route the message toward an address manager of the local trusted node based on the validation;
  b) the address manager configured to, on receiving the message from the validator:
    read local address data by decrypting at least one second portion of the inner header; and
    generate, based on at least one of the decrypted local address data and the data payload, at least one local message for routing within the local network.

2. The multilevel security network of claim 1, where the message is an inbound message, the destination node is an inbound destination node, the data payload is an inbound data payload, the inner header is an inbound inner header, the outer header is an inbound outer header, and:
  the LTN is configured to receive at least one outbound message from the local network, the outbound message associated with an outbound destination node external to the local network and comprising at least one of an outbound data payload and an outbound inner header.

3. The multilevel security network of claim 2, wherein:
  the address manager is configured to modify the outbound message by encrypting at least one of the outbound data payload and a first portion of the outbound inner header based on the outbound destination node; and
  the validator is configured to:
    encrypt a second portion of the outbound inner header based on the outbound destination node;
    generate an outbound outer header based on at least one of the outbound inner header and the outbound destination node; and
    route the outbound message toward the outbound destination node according to the outbound outer header.

4. The multilevel security network of claim 1, wherein the GTN is a first GTN, and:
  the GTN is configured to route the message toward the destination node via a path including at least one of a second GTN and a UTN of the plurality of UTN.

5. The multilevel security network of claim 4, wherein:
  the decrypted first portion of the inner header includes a minimum route number (MRN), where the MRN is an integer; and
  the path includes a number of second GTN not less than the MRN.

6. The multilevel security network of claim 5, wherein modifying the outer header includes decrementing the MRN.

7. The multilevel security network of claim 1, wherein:
  the local address data includes at least one of a local address map and a local destination node associated with the local network; and
  the address manager is configured to regulate the routing of the local message through the local network based on whether the at least one local address map is within an allowable access range associated with the local destination node.

8. The multilevel security network of claim 1, wherein validating at least one of the source address and the destination address includes comparing the decrypted first portion of the inner header to the outer header.

9. A multilevel security network, comprising:
  a plurality of local nodes;
  a communication fabric comprising a plurality of communication ports connecting the communication ports to the local nodes, the communication fabric configured to facilitate communications between the plurality of local nodes;
  a root of trust configured to define one or more allowable address ranges for the plurality of local nodes;
  a plurality of trusted address management units (AMU) communicatively coupled to the plurality of communication ports, the plurality of local nodes, and the root of trust, each trusted AMU associated with at least one local node of the plurality of local nodes and configured to:
    extract one or more address maps from at least one local message associated with the associated local node; and
    regulate communication with the associated local node based on whether the extracted address maps are within the allowable address ranges corresponding to the associated local node;
  and
  at least one local trusted node (LTN) coupled to the communication fabric and to one or more external nodes, the LTN comprising:
    at least one validator configured to:
      receive at least one inbound message from the one or more external nodes, the inbound message comprising one or more of an unencrypted outer header, an encrypted inner header, and a data payload;
      decrypt a first portion of the inner header;
      validate at least one of a source address and a destination address of the inbound message based on the decrypted first portion; and
      route the inbound message toward at least one address manager based on the validation;
    the at least one address manager configured to, on receiving the inbound message from the validator:
      read local address data by decrypting at least one second portion of the inner header; and
      generate, based on at least one of the decrypted local address data and the data payload, at least one local message for routing between the plurality of local nodes.

10. The multilevel security network of claim 9, wherein the data payload is an inbound data payload, the inner header is an inbound inner header, the outer header is an inbound outer header, and:
  the LTN is configured to receive at least one outbound message via the communication fabric, the outbound message associated with at least one external destination node of the one or more external nodes and comprising at least one of an outbound data payload and an outbound inner header.

11. The multilevel security network of claim 10, wherein:
  the address manager is configured to modify the outbound message by encrypting at least one of the outbound data payload and a first portion of the outbound inner header based on the external destination node;
  and
  the validator is configured to:
    encrypt at least one second portion of the outbound inner header based on the external destination node;
    generate at least one outbound outer header based on one or more of the outbound inner header and the external destination node;
    and
    route the outbound message toward the external destination node according to the outbound outer header.

12. The multilevel security network of claim 11, wherein:
  the LTN is configured to route the outbound message toward the destination node via a path including at least one of a global trusted node (GTN) and an untrusted node (UTN).

13. The multilevel security network of claim 12, wherein:
  the encrypted second portion of the outbound inner header includes a minimum route number (MRN), where the MRN is an integer;
  and
  the path includes a number of GTN not less than the MRN.

14. The multilevel security network of claim 9, wherein:
  the local address data includes at least one of an associated node of the plurality of local nodes and a local address map associated with the associated node;
  and
  the address manager is configured to regulate the routing of the local message between the plurality of local nodes based on whether the at least one local address map is within the allowable access ranges associated with the associated node.

15. The multilevel security network of claim 9, wherein validating at least one of the source address and the destination address includes comparing the decrypted first portion of the inner header to the outer header.

* * * * *